May 13, 1941.  H. S. W. BÖLLINGER ET AL  2,241,764
POWER TRANSMISSION
Filed Nov. 6, 1936    8 Sheets-Sheet 2
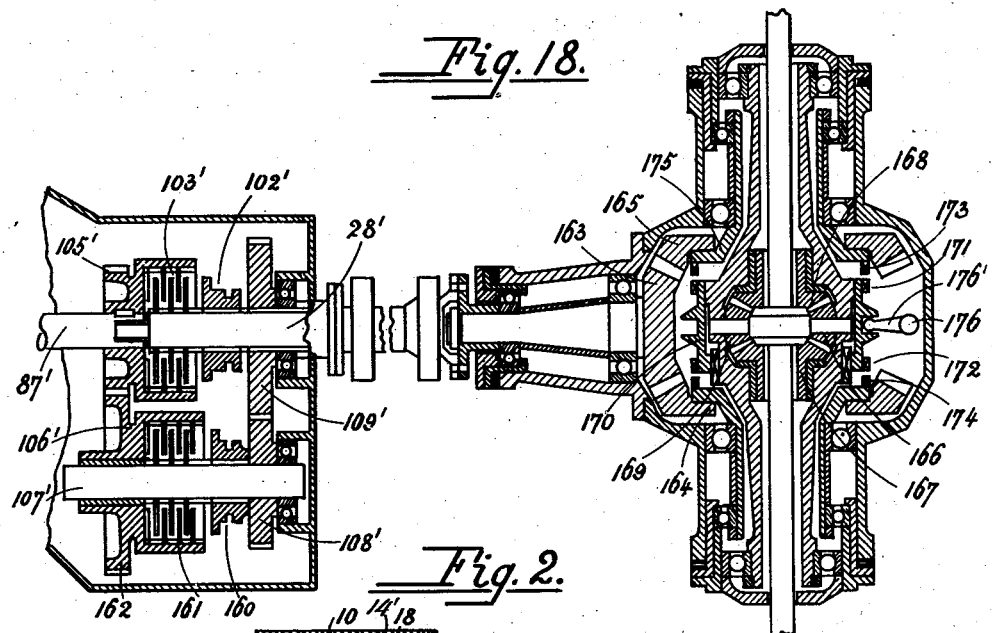
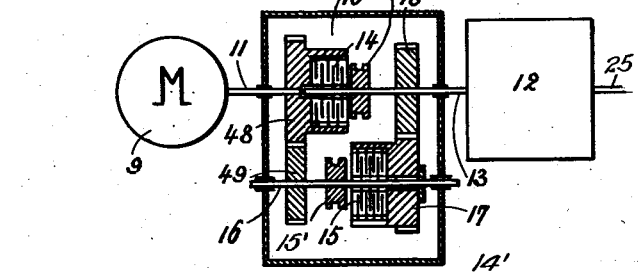
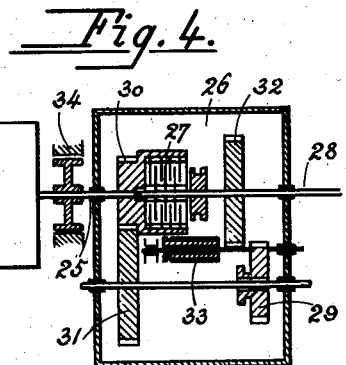
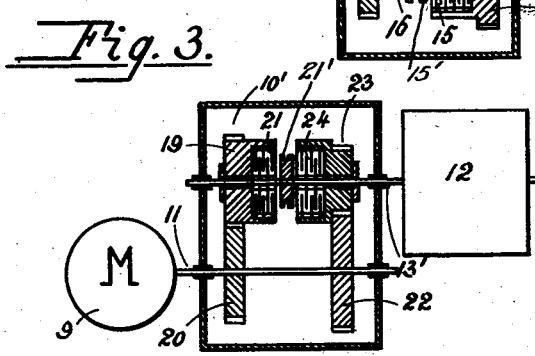
Inventors:
Hanns Stephan Wilhelm Böllinger
Walter Moritz Alwin Gottschalck
per Karl A. Mayr
Attorney.

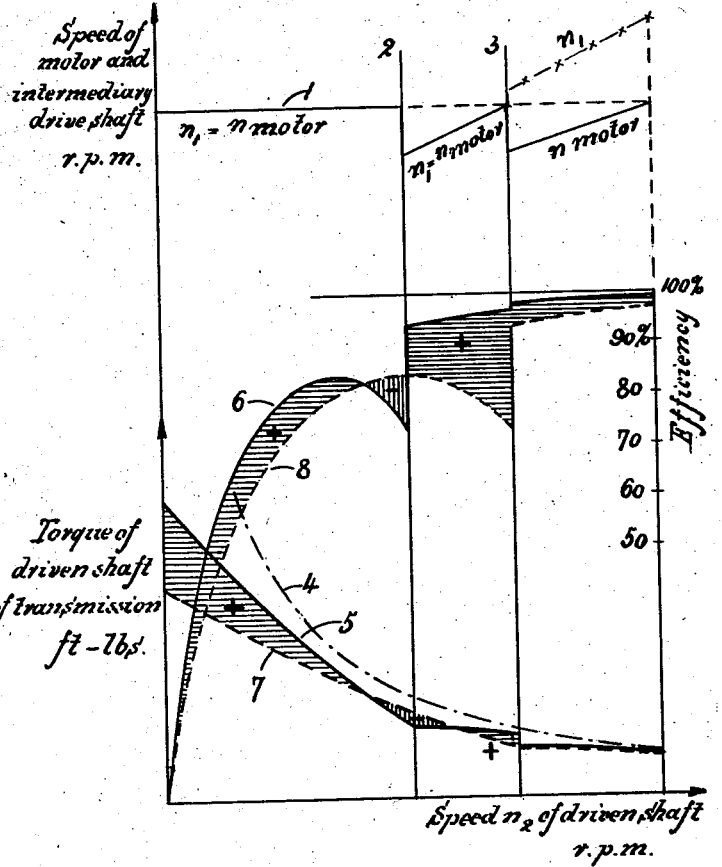
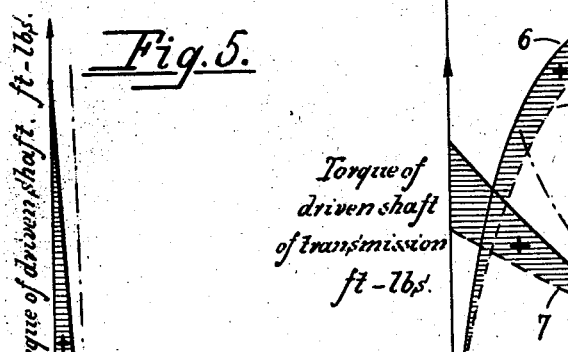
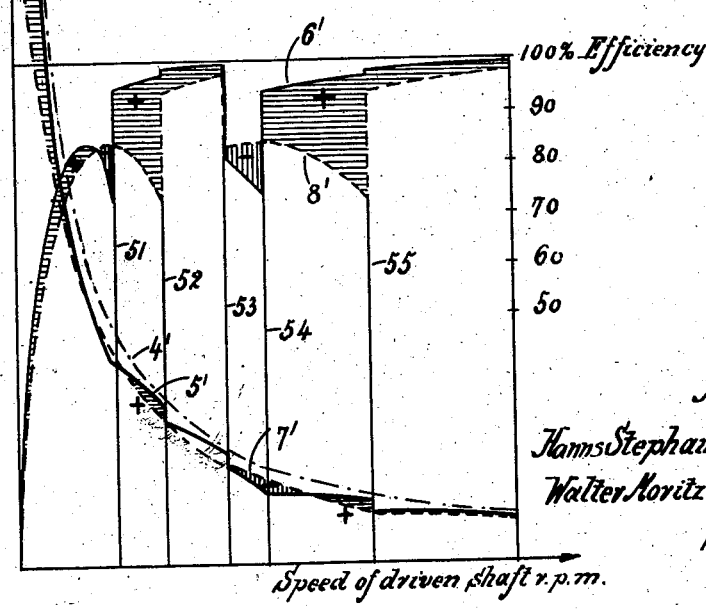

May 13, 1941.  H. S. W. BÖLLINGER ET AL  2,241,764
POWER TRANSMISSION
Filed Nov. 6, 1936   8 Sheets-Sheet 3

INVENTORS
HANNS STEPHAN WILHELM BÖLLINGER.
WALTER MORITZ ALWIN GOTTSCHALCK.
BY
Karl A. Mayr.
ATTORNEY

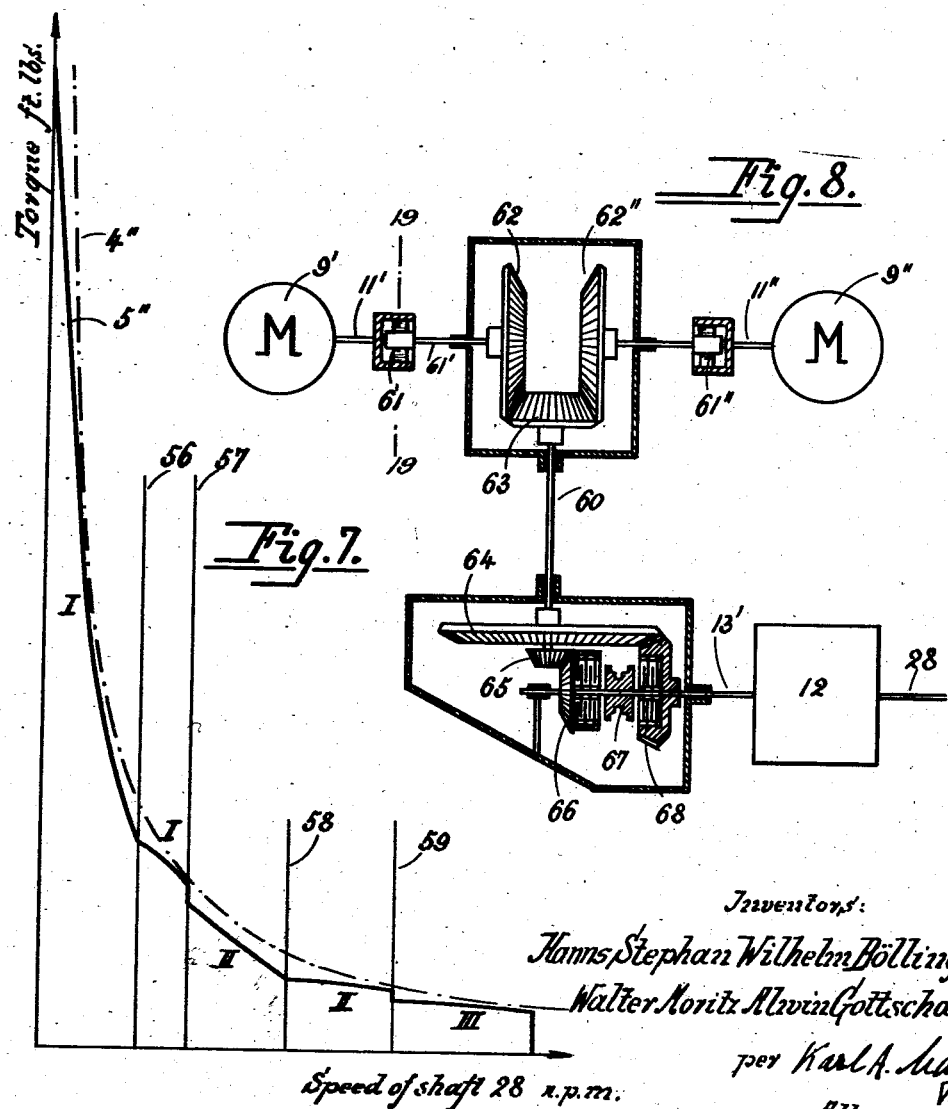

May 13, 1941. H. S. W. BÖLLINGER ET AL 2,241,764
POWER TRANSMISSION
Filed Nov. 6, 1936   8 Sheets-Sheet 5

Inventors:
Hanns Stephan Wilhelm Böllinger
Walter Moritz Alwin Gottschalck
per Karl A. Mayr
Attorney.

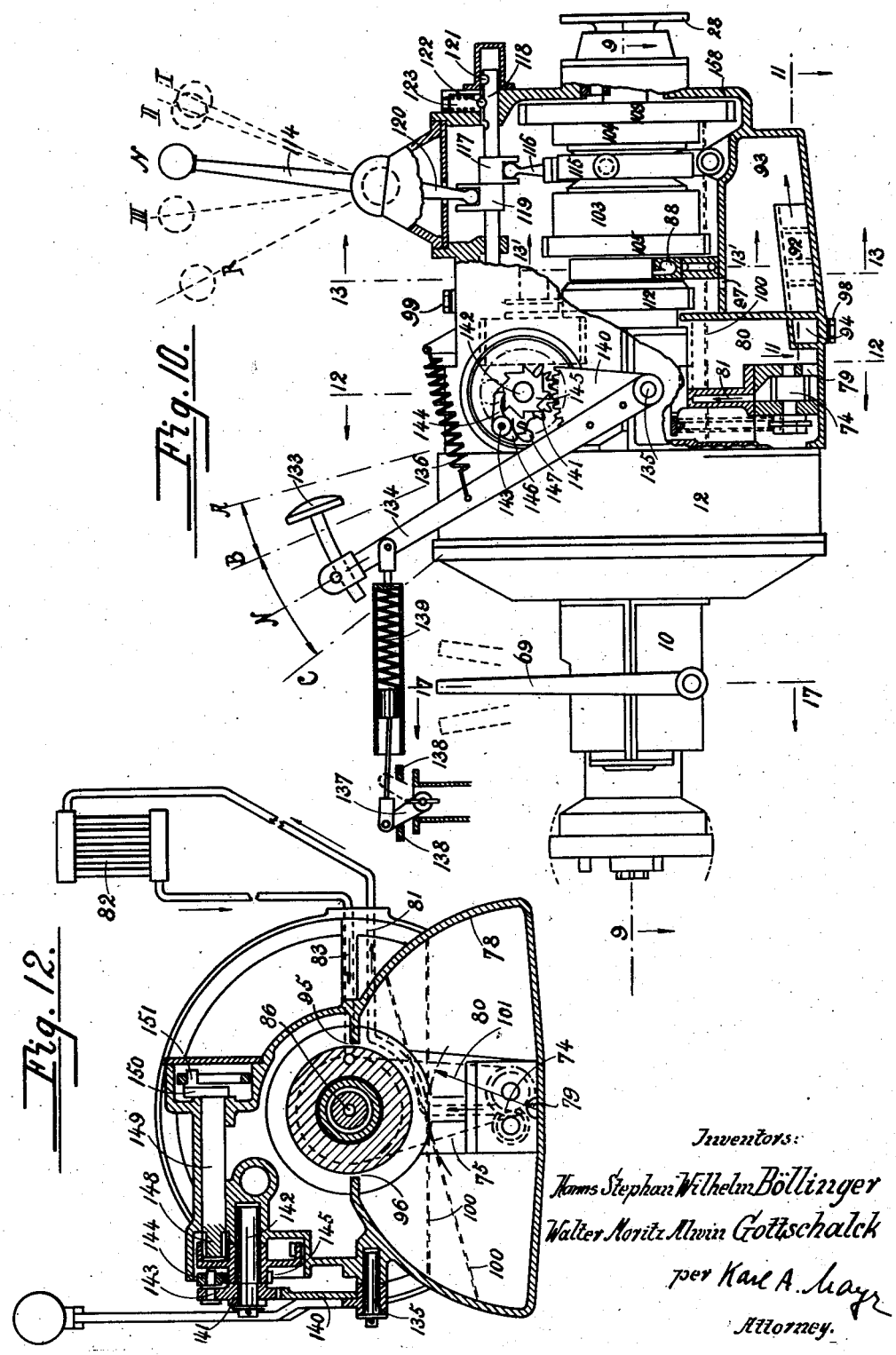

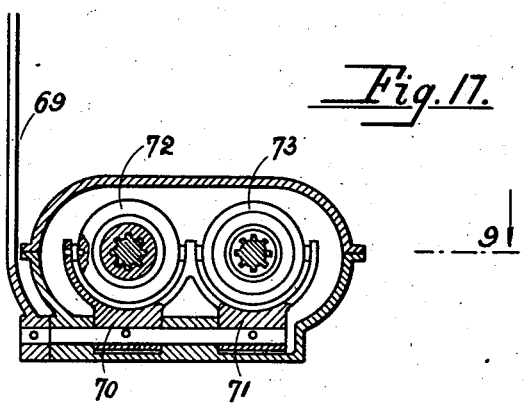
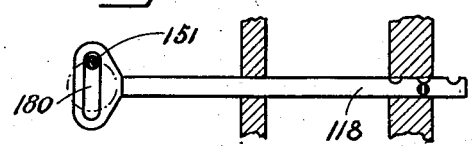
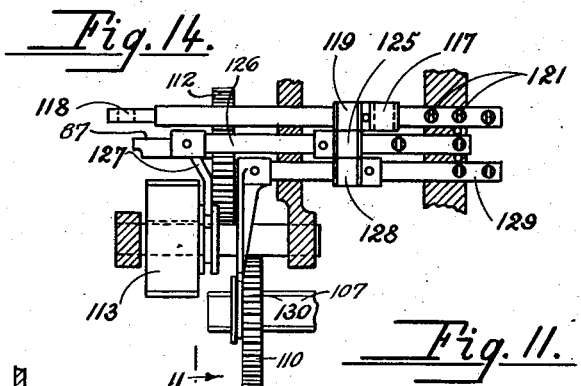
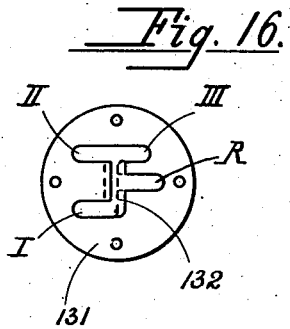
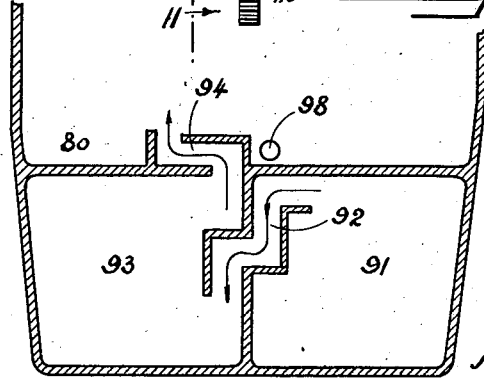

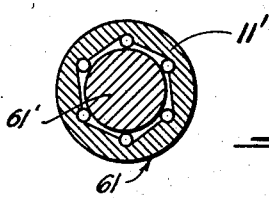
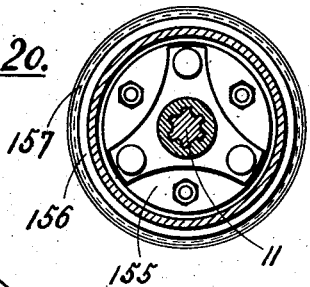
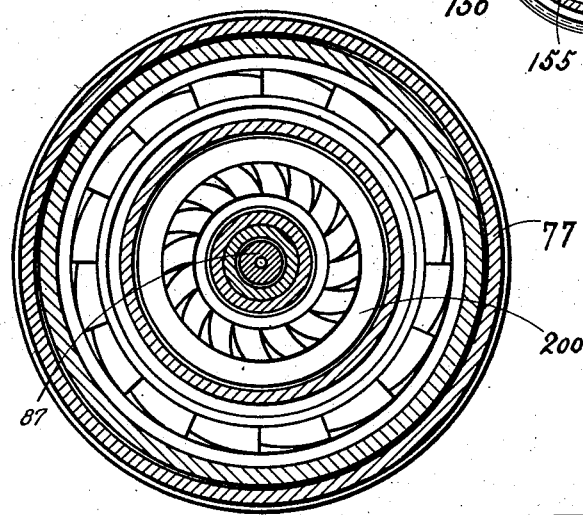
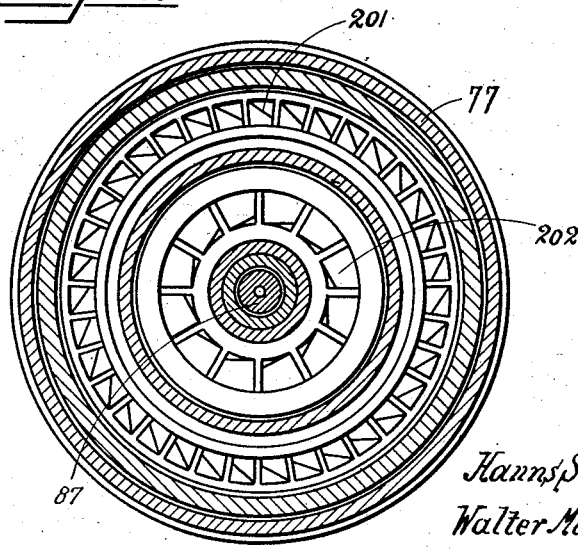
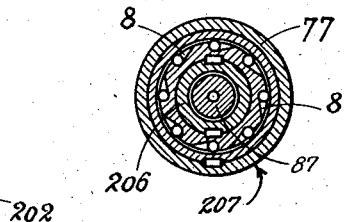

Patented May 13, 1941

2,241,764

UNITED STATES PATENT OFFICE 2,241,764

POWER TRANSMISSION

Hanns Stephan Wilhelm Böllinger and Walter Moritz Alwin Gottschalck, Frankenthal, Pfalz, Germany, assignors to Klein, Schanzlin & Becker Aktiengesellschaft, Frankenthal, Germany Application November 6, 1936, Serial No. 109,504
In Germany November 6, 1935

11 Claims. (Cl. 74—189.5)

The present invention relates to a power transmission, particularly to a power transmission in which the speed of the drive shaft is susbtantially maintained at all operating conditions of the driven shaft and which power transmission comprises a hydraulic part which comprises a hydraulic coupling and one or a plurality of hydraulic torque transformers, whereby said coupling and said transformer or transformers may be independent from one another with respect to the flow of operating fluid or may be hydraulically interconnected. Hydraulic transmissions suitable for use in connection with the present invention are disclosed in the U. S. Patents No. 1,970,236, No. 1,990,021, No. 2,014,944, No. 2,018,616, No. 2,037,252, No. 2,042,189, and will, therefore, not be described in detail in the present application.

An object of the present invention resides in the provision of a transmission of the type described, which transmission comprises speed changing means arranged in between the driving motor and the hydraulic part, whereby the hydraulic part of the transmission can operate at high efficiency at all operating conditions.

Another object of this invention is to provide an especially designed casing for a hydraulic transmission, whereby the operating fluid is circulated in such manner that foaming of the fluid is effectively prevented and air contained in the fluid is removed. The fluid which, as a rule, is oil consecutively passes through a plurality of chambers which are built integral with the transmission casing. In between the chambers, the oil passes through labyrinth channels which aid in removing air and foam from the oil. The oil leaves the rotary hydraulic transmission through channels which are adjacent to the center of rotation and not on a large diameter which would cause undesired foaming of the oil. In case a mechanical speed changing mechanism is built integral with the hydraulic transmission, the above mentioned chambers are preferably situated underneath said mechanism, whereby considerable downward extension of the casing of the transmission is saved and the overall diameter of the casing only little exceeds that of the rotors of the hydraulic transmission. This is important when the transmission is used in connection with motor cars, rail cars and the like because the center of gravity and the axis of rotation of the transmission can be situated low down in the car.

A further object of the present invention is the provision of a variable speed power transmission which comprises a hydraulic transmission and a variable speed mechanical transmission, which latter is connected to the shaft driven by said hydraulic part and comprises automatically acting brake means which temporarily have a braking effect on said hydraulic transmission for facilitating the speed changing operations.

Another object of this invention resides in the provision of a variable speed power transmission which comprises a hydraulic transmission and a variable speed mechanical transmission, which latter is connected to the shaft driven by said hydraulic part, and a casing common to both said hydraulic and said mechanical transmissions.

A further object of this invention is to provide a variable speed power transmission which comprises a hydraulic transmission and a variable speed mechanical transmission, which latter is connected to the shaft driven by said hydraulic part and comprises a plurality of clutches, by the operation of which the individual speed transmissions are directly brought into action and no individual coupling means need be operated separately from the speed changing operations.

Further and other objects of the present invention will be hereinafter described in the accompanying specification and claims and shown in the drawings which, by way of illustration, show what we now consider to be a preferred embodiment of our invention.

In the drawings:

Fig. 1 is a diagram showing the speed of the drive shaft and the speed of the shaft driving the hydraulic transmission, the driving power available at the driven shaft, the efficiency of the hydraulic transmission of a transmission according to the present invention as compared with conditions of transmissions known in the art.

Fig. 2 is a diagrammatic layout of a transmission according to the present invention.

Fig. 3 is a diagrammatic layout of a modified transmission according to the present invention.

Fig. 4 is a diagrammatic layout of another modification of a transmission according to the present invention.

Fig. 5 is a diagram showing operating conditions obtained with a transmission according to Fig. 4.

Fig. 7 is a diagram showing operating conditions obtained with a transmission according to Fig. 6.

Fig. 8 is a diagrammatic layout of yet another modification of the present invention.

Fig. 10 is a part sectional side view of the transmission shown in Fig. 9.

Fig. 11 is a horizontal sectional view taken along line 11—11 of Fig. 10.

Fig. 12 is a transverse sectional view of a transmission according to the present invention taken along line 12—12 of Fig. 10.

Fig. 14 shows a detail of the gear shifting mechanism of the transmission shown in Figs. 9 to 13.

Fig. 15 shows another detail of the gear shifting mechanism of the transmission shown in Figs. 9 to 13.

Fig. 16 shows a further detail of the gear shifting mechanism of the transmission shown in Figs. 9 to 13.

Fig. 17 is a transverse sectional view of the transmission shown in Fig. 10 and taken along line 17—17 of Fig. 10.

Fig. 18 is a diagrammatic layout of a modification of the present invention.

Fig. 19 is a cross sectional view of the free wheel couplings 61 and 61'' of Fig. 8.

Fig. 20 is a sectional view taken along line 20—20 of Fig. 9.

Fig. 21 is a sectional view taken along line 21—21 of Fig. 9 looking in the direction of the arrows 21, 21.

Fig. 22 is a sectional view taken along line 22—22 of Fig. 9 looking in the direction of the arrows 22, 22.

Fig. 23 is a sectional view taken along line 23—23 of Fig. 9.

Like parts are designated by like numerals in all figures of the drawings.

Figure 6:
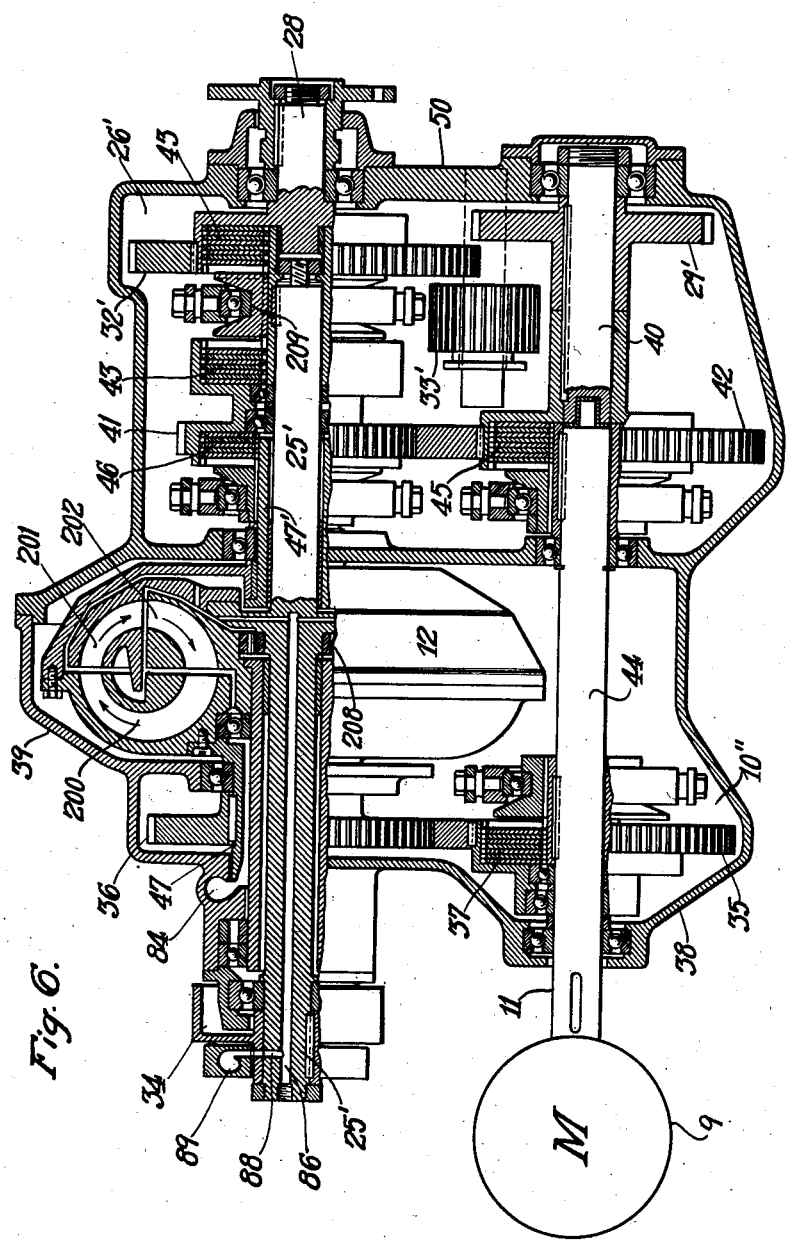
Fig. 6 is a diagrammatic layout of a further modification of the present invention.

Fig. 1 of the drawings represents a coordinate system, the abscissae of which represent the speed $n_2$ of the driven shaft of a transmission according to the present invention which will be described later. The ordinates represent the speed $n$ of the driving motor 9 shown in Figs. 2, 3, 4 and 6, and the speed $n_1$ of the intermediary drive shaft 13 which is shown in Figs. 2, 3, 4 and 9. With respect to curves 4, 5, and 7, the ordinates represent the torque of the driven shaft of various types of transmissions, and with respect to curves 6 and 8, the ordinates represent efficiencies. Line 1 represents the speed $n$ of the motor 9 which speed, up to abscissa 3, is equal to the speed $n_1$ of the shaft 13 driving the hydraulic part 12 of the transmission according to the present invention. Up to abscissa 2, the hydraulic part of the transmission operates as torque transformer; between abscissae 2 and 3, the hydraulic part operates as hydraulic coupling. As soon as the driven shaft of the transmission has reached a speed represented by abscissa 3, the speed changing means arranged in between the driving motor and the hydraulic part of the transmission come into operation and the speed $n_1$ of the shaft driving the hydraulic part is, from this point on, greater than that of the motor. The dash and dotted hyperbola 4 shows the driving power which would be available at the driven shaft of the transmission if the efficiency of the transmission were 100%. The solid line 5 shows the driving power available with a transmission according to the present invention consisting of the combination of hydraulic torque transformers, hydraulic couplings, and speed changing means. It is obvious that line 5 comes close to the ideal line 4. The solid line 6 represents the efficiencies obtained with the hydraulic part of the transmission according to the present invention and in the particular combination as will be described later. For the sake of comparison, the dotted line 7 shows the driving power available if solely a hydraulic transmission is used. The dotted line 8 shows the efficiencies available from such a transmission which has no speed changing means connected therewith. The horizontally shaded areas designated with a + sign show the advantages obtained with the combination of speed changer, hydraulic coupling, and hydraulic torque transformer, which combination is an object of the present invention. The vertically shaded areas designated with a − sign show the disadvantages connected with the combination according to the present invention, which disadvantages are negligible as compared with the advantages obtained by the present invention. The hydraulic coupling operates at favorable efficiencies at a broad range of operating conditions. If the transmission is used, for example, for driving a motor car, a considerably greater starting power is obtained and, due to the better efficiencies at which the hydraulic transmission is operated, improved running conditions of the car and a considerable decrease in the fuel consumption are obtained. If the speed changing means comprise a plurality of speed changing ratios, the operating conditions still further approach the ideal conditions shown by the hyperbola 4.

Figs. 2 and 3 schematically show arrangements according to our invention, by means of which the conditions set forth above and in Fig. 1 can be obtained. In Fig. 2, 9 represents a motor which is connected with the speed changing transmission 10 by means of shaft 11. 12 is the hydraulic transmission which is connected to the speed changer 10 by means of shaft 13. The hydraulic transmission 12 is of the type set forth in U. S. Patent No. 1,970,236. It is also shown in detail in Fig. 9 of the drawings. Toothed wheel 48 is rigidly connected with shaft 11; it carries the friction coupling 14 one part of which is axially movable but not rotatable on shaft 13 and which can be engaged by laterally moving member 14' to the left on shaft 13, which shaft is then connected with shaft 11. Toothed wheel 18 is rigidly connected with shaft 13. There is also an auxiliary shaft 16 to which toothed wheel 49 is rigidly connected, which latter is always in engagement with wheel 48. Toothed wheel 17 is rotatable on shaft 16 and is in engagement with wheel 18 and carries a friction clutch 15, one part of which is axially movably but not rotatably connected with shaft 16; this clutch is engaged by lateral movement of clutch engaging member 15' to the right. If it is desired that the hydraulic part 12 of the transmission be driven at the same speed as shaft 11, then coupling 14 is engaged and coupling 15 is disengaged. If it is desired that coupling 12 be driven at higher speed, then coupling 15 is engaged and coupling 14 disengaged. The power of motor 9 is then transmitted by means of gears 48 and 49 to the auxiliary shaft 16 and therefrom by means of clutch 15 and tooth wheels 17 and 18 to shaft 13. The hydraulic transmission 12 drives a shaft 25 to which any member to be driven may be connected.

The arrangement illustrated by Fig. 2 must not be interpreted as an arrangement in which there is a speed changer permanently interposed between the motor 9 and the hydraulic transmission 12 in order to always drive the hydraulic transmission at higher speeds than the motor, whereby a hydraulic transmission of smaller size and less weight can be used.

The following parts cooperate when the transmission shown in Fig. 2 is set for operating at first speed:

11—48—14—18—13

The following parts cooperate when the same transmission is set for operating at second speed:

11—48—49—16—15—17—18—13

Fig. 3 shows a modification of the arrangement shown in Fig. 2, in which modification the transmission 10' is so arranged that the power supplied by motor 9 is transmitted to the hydraulic transmission 12 by means of speed increasing gears. Motor 9 is connected to and drives shaft 11. To this shaft, toothed wheels 20 and 22 are rigidly connected. There is another shaft 13' which rotatably carries toothed wheels 19 and 23 which individually engage wheels 20 and 22, respectively. With wheel 19, a clutch 21 and, with wheel 23, a clutch 24 are connected. Each clutch has a member which is axially movably but not rotatably connected with shaft 13'. Said last mentioned members can be axially displaced and thereby the clutches individually engaged by manipulation of the clutch engaging member 21'. When one clutch is engaged, the wheel connected thereto is rigidly connected with shaft 13'. The power is transmitted either through gears 19, 20 and clutch 21 to shaft 13' or through gears 22, 23 and clutch 24 to shaft 13', whereby the latter mode of transmission causes a higher speed of shaft 13' than the former.

In the arrangement according to Fig. 3, power is transmitted by the following parts when the transmission operates at first speed:

11—20—19—21—13'

Power is transmitted by the following parts when the transmission is set for operating at second speed:

11—22—23—24—13'

A still greater adaptability to variable power requirements at the driven shaft of the transmission can be obtained by providing speed changing means not only between motor and hydraulic transmission but also at the driven side of the hydraulic transmission. Such an arrangement is schematically shown in Fig. 4 of the drawings. It consists of the motor 9, variable speed transmission 10, and hydraulic transmission 12, which parts are arranged in the same manner as shown in Fig. 2; or instead of the variable speed transmission 10, the gears 10' as shown in Fig. 3 may be used in place of transmission 10. To the driven shaft 25 of the hydraulic transmission 12, transmission 26 is connected. By engaging clutch 27, the speed of shaft 25 is transmitted unchanged to shaft 28 to which a power consumer, for example, the drive shaft of a car may be connected. By disengaging coupling 27 and moving wheel 29 to the left, power is transmitted from shaft 25 by means of gears 30, 31 and 29, 32 to shaft 28 which then operates at different speed as compared with the speed of shaft 25. A pinion 33 may be provided which, if moved to the right, engages gears 29 and 32, whereby the direction of rotation of shaft 28 is reversed with respect to that of shaft 25.

In order to ease the gear shifting operation, a brake 34 may be provided on shaft 25, which brake prevents racing of the parts to the left of shaft 25 as long as the transmission 26 is in neutral position.

The following parts take part in the transmission of power as shown in Fig. 4 when the transmission takes place at first speed:

11—14—13—12—25—30—31—29—32—28

Power is transmitted by the following parts when the transmission is set at second speed:

11—48—49—16—15—17—18—13—
           12—25—30—31—29—32—28

Power is transmitted by the following parts when the transmission is set at third speed:

11—14—13—12—25—27—28

Power is transmitted by the following parts when the transmission is set at fourth speed:

11—48—49—16—15—17—
           18—13—12—25—27—28

Power is transmitted by the following parts when the transmission is set for slow speed reverse driving:

11—14—13—12—25—30—31—29—33—32—28

Power is transmitted by the following parts when the transmission is set for high speed reverse driving:

11—48—49—16—15—17—18—13—
           12—25—30—31—29—33—32—28

By means of curves plotted in a coordinate system, the diagram Fig. 5 shows some of the advantages obtained with an arrangement as per Fig. 4. The abscissae represent the speed of shaft 28. The ordinates represent in the case of curves 4', 5', and 7' the driving power available from shaft 28, for example, in lbs. and in the case of curves 6' and 8' efficiency in per cent. The dash and dotted hyperbola 4' shows the driving power which would be available at the driven shaft of the transmission if the efficiency of the transmission were 100%. The solid line 5' shows the power available at shaft 28 with a transmission according to the present invention and according to Figs. 4 and 5 of the drawings. Up to the speed represented by abscissa 51, the torque transformer is in operation, and between speed 51 and 53 the hydraulic coupling. Up to speed 52, the mechanical gears are set for first speed; from speed 52 to speed 53, the mechanical gears are set for second speed; from speed 53 to speed 54, the hydraulic torque transformer and from speed 53 to full speed the hydraulic coupling is in operation; from the speed represented by abscissa 53 to the speed represented by abscissa 55, the mechanical gears are set for third speed, and for the range from abscissa 55 to full speed the mechanical gears are set for fourth speed.

If there is only a speed changing mechanism arranged in between the hydraulic transmission 12 and the shaft 28 but no speed changing mechanism in between the motor and the hydraulic transmission, conditions are obtained as shown by the dotted line 7'. It should be noted that by the arrangement of a speed changing mechanism between the motor and the hydraulic transmission a considerably greater starting power is available. The increase in power available at shaft 28 is shown by the horizontally shaded areas and the decrease by the vertically shaded areas. The latter is negligibly small. The solid line efficiency curve 6' shows the efficiency of the hydraulic transmission in combination with the speed changing mechanism between motor and said transmission and the dotted curve 8' the efficiencies when such mechanism is omitted. The improvement in efficiency obtained is represented by the horizontally shaded areas, the decrease is shown by the vertically shaded areas; the latter is negligible as compared with the improvement obtained.

A further modification of the invention is schematically shown in Fig. 6 of the drawings. In this arrangement the transmission 10'' which is arranged between motor 9 and hydraulic transmission 12 is so connected with transmission 12 and transmission 26', which latter is arranged between the hydraulic transmission 12 and driven shaft 28, that one set of gears of transmission 26' is used for driving transmission 12 at increased speed, whereby one set of gears is rendered superfluous and the transmission is arranged in one unit which is simpler than the transmission shown in Fig. 4. In between the motor shaft 11 and the hydraulic transmission 12, a simple gearing 35, 36 and a clutch 37 are arranged within a casing 38, which casing may be integral with casing 39 of the hydraulic transmission.

Transmission 26' comprises an auxiliary shaft 40 which is driven by shaft 25' by means of gears 41, 42.

The other parts of transmission 26' will be explained by explaining the operation of the transmission illustrated in Fig. 6.

The power of motor 9 is transmitted by means of shaft 11, clutch 37 which then is in engaged position, and gears 35, 36 to the primary shaft 47 of hydraulic transmission 12. Primary shaft 47 is connected to the impeller wheel 200 of the hydraulic transmission 12. This impeller wheel causes flow of the operating fluid which drives the turbine wheel 201 to which the secondary shaft 25' is connected which shaft extends to the left and to the right inside of the hollow shaft members 47 and 47' which shaft members extend through the walls of casing 39 to the outside of said casing. An auxiliary wheel 202 may be interposed in the fluid flow and adapted to be temporarily keyed to the stationary casing by coupling means 208 so as to act as a stationary guide wheel and have a torque converting effect. A more detailed explanation of the hydraulic transmission can be found in Figs. 9 and 19–23 of the drawings and the description thereto. The secondary shaft 25' of transmission 12 is connected, according to the position the clutch operating member 209 of double-acting clutch 43, either directly to shaft 28 when member 209 is moved to the right, or when member 209 is moved to the left, by means of gears 41, 42, the auxiliary shaft 40, and the gears 29', 32' to shaft 28. In both of the last mentioned modes of transmission either the hydraulic coupling or the hydraulic torque transformer of the hydraulic transmission 12 may be in operation.

When it is desired to operate the hydraulic transmission at increased speed, coupling 37 is disengaged and power is transmitted by means of shaft 44 which is an extension of shaft 11, clutch 45 which is then in engaged position, gears 42, 41, and clutch 46 which is in engaged position to the primary shaft member 47' of the hydraulic transmission 12 which member carries one part of clutch 46. Operating member 209 of the double-acting clutch 43 is then in its extreme right position to connect shafts 25' and 28. Upon moving pinion 33' to the right to engage wheels 29' and 32', setting clutch operating member 209 to the left to connect shaft 25' and wheel 41, and transmitting power by means of clutch 37, gears 35, 36, and shaft 47 to hydraulic transmission 12, the total transmission is set for reverse drive. Transmission 26' may be arranged in a casing 50 which is connected with casing 39 of the hydraulic transmission 12. For facilitating the gear shifting operations, a brake 34 may be provided on shaft 25'.

In the arrangement according to Fig. 6, the following parts cooperate when the transmission is set for operating at first speed and power is transmitted by means of parts 11—37—35—36—47—12—25'—43—41—42—40—29'—32'—28; at second speed power is transmitted by means of parts 11—37—35—36—47—12—25'—43—28; at third speed power is transmitted by means of parts 11—44—45—42—41—46—47—12—25'—43—28; at fourth speed power is transmitted by means of parts 11—44—45—40—29'—32'—28.

When reversing the direction of rotation and at slow speed of shaft 28, power is transmitted by means of the following parts: 11—37—35—36—47—12—25'—43—41—42—40—29'—33'—32'—28.

When reversing the direction of rotation and at high speed of shaft 28, power is transmitted by means of the following parts: 11—37—44—45—40—29'—33'—32'—28.

The solid line curve in diagram Fig. 7 shows the driving power available from shaft 28 at various speeds of shaft 28. In the speed range up to abscissa 57, the mechanical gears are set for first speed, in the range between abscissae 57 and 59 for second speed, and in the range above the speed represented by abscissa 59 for third speed. Up to speed 56 and also between 57 and 58, the hydraulic torque transformer is in operation, and in the range between speeds 56 and 57 and from 58 upwards, the hydraulic coupling is in operation. The dash and dotted hyperbola 4'' shows the ideal operating conditions which are very nearly approached by the actual conditions represented by the solid line curve 5''.

Figs. 8 and 19 show an embodiment of the present invention in which two motors 9' and 9'' are used. From motor 9' power is transmitted to shaft 60 by means of shaft 11', free wheel coupling 61, shaft 61', and bevel gears 62, 63, and from motor 9'' by means of shaft 11'', free wheel coupling 61'' and bevel gears 62'', 63. Shaft 60 carries bevel gear wheel 64 and 65. Wheel 65 is in mesh with wheel 66 and, when coupled up with shaft 13' by means of clutch 67, transmits power to hydraulic transmission 12. If a higher speed of shaft 13' is desired, clutch 67 is so set as to connect bevel gear wheel 68 which is in mesh with wheel 64 with shaft 13'.

Whereas in Figs. 2, 3, 4, 6, and 8 schematic showings only are given of embodiments of the present invention, the now to be described Figs. 9 to 17, inclusive, show constructional details of the modification shown in Fig. 2. These details are individually also suitable for constructing the transmissions shown in Figs. 3, 4, 6, and 8.

Figure 9:
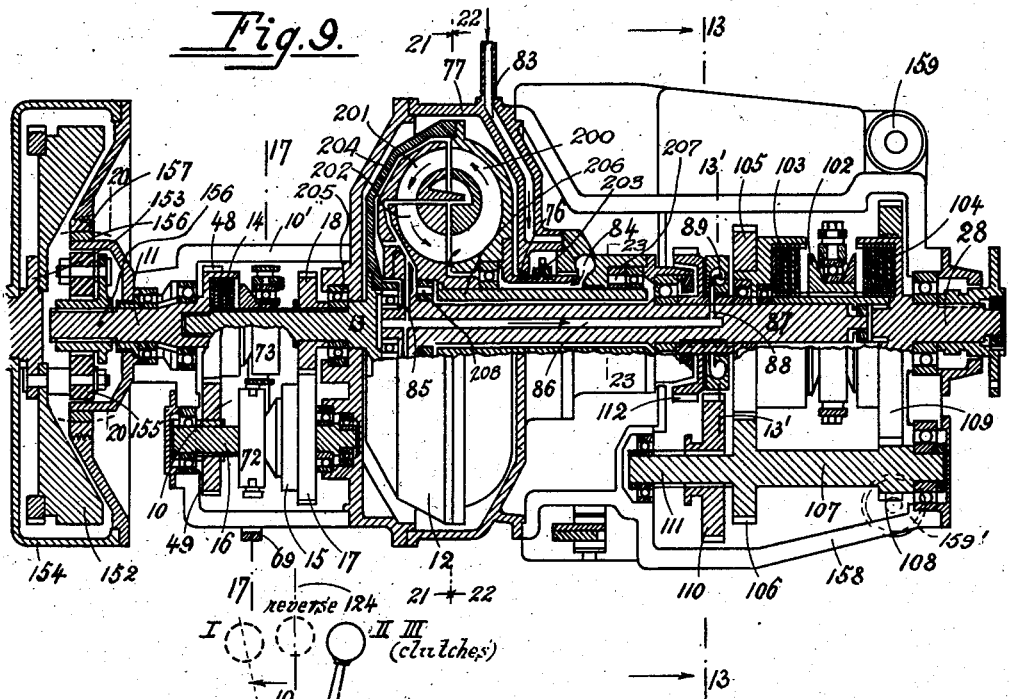
Fig. 9 is a longitudinal horizontal sectional view of a transmission according to the present invention as is partly shown in Fig. 2.

In Fig. 9, 152 represents the fly wheel of the motor which is connected to crank shaft 153 of which only a part is shown. 154 is part of the motor casing. Fly wheel 152 is connected with shaft 11 by means of the elastic ring 155. The left end 156 of casing 10 of the speed changing gear, which will be described later, has a balllike configuration which movably fits into the concave spherical surface 157 of casing 154. The center of the spherical surface 157 and the ball-shaped end 156 is the same as the center of ring 155. Casing 10' is rigidly connected with the casing of the hydraulic transmission 12, and the latter is rigidly connected with casing 158 of the variable speed transmission connected to the driven shaft 87 of hydraulic transmission 12. Casing 158 is provided with two supports which may be resiliently connected with the base for supporting motor and transmission in the conventional manner. 159 is one of said supports; the other support 159' is arranged symmetrically with respect to support 159. Thus the transmission is supported at three points one of which is the center point 156' of the ball-shaped end 156 and the other two are the supports 159 and 159' connected with casing 158.

The speed changing gear 10 is arranged in between shaft 11 driven by the motor and hydraulic transmission 12. Speed changing gear 10 is of the same construction as is schematically shown in Fig. 2. In the embodiment shown in Fig. 9, the number of teeth of wheel 48 is equal to that of wheel 49. In this case, also the friction clutches 14 and 15 can have the same dimensions. The clutches are operated simultaneously by means of clutch lever 69 which is shown in Fig. 10 in neutral position. By moving it to the left, clutch 14 is engaged and the gear is set for first speed. By moving it to the right, as shown in Fig. 10, clutch 15 is engaged and the gear is set for operating shaft 13 at high speed. Fig. 17 shows in detail how lever 69 is connected to the forks 70 and 71, which forks are movably connected with the clutch shifting discs 72 and 73, respectively.

The hydraulic transmission 12 corresponds to the one shown in Figs. 6, 9, and 10 of the drawing of the U. S. Patent No. 1,970,236. The transmission comprises a single closed fluid circuit within which the working fluid circulates in the direction of the arrows and which comprises a bladed pump or impeller wheel 200, the blades of which can be seen in Fig. 21, a bladed turbine wheel 201, and a bladed auxiliary wheel 202, the blades of which are seen in Fig. 22.

The pump wheel 200 having a collar 203 at its rear side is cooperatively connected through a shell 204 with the driving shaft 13 which rotates in a bearing 205 supporting the rotary part of the transmission device. The turbine wheel 201 is connected with the secondary shaft 87 which is supported by a number of ball bearings within the rotary and the stationary section of the device.

The auxiliary wheel 202 is keyed to a sleeve 206.

A self-locking and unlocking mechanism 207 of the roller and inclined slot type 3 (Fig. 23) is provided between the sleeve 206 and the casing 77, so designed that the auxiliary wheel 202 is automatically interlocked with the casing 77, so as to act periodically as a stationary guide wheel in the manner of the Föttinger torque converter when wheel 202 endeavors to rotate in clockwise direction; another coupling mechanism 208 of the roller and inclined slot type is provided for automatically interlocking the secondary shaft 87 and the auxiliary wheel 202 under working conditions, when the latter, on rotating in anti-clockwise direction, endeavors to overtake the secondary shaft 87. The bladed auxiliary wheel 202 is so designed and cooperatively associated with the turbine 201, the pump 200 and the secondary shaft 87, as to be capable of alternately performing the duty of a stationary guide rim, like that in the Föttinger torque converter, and acting as an auxiliary turbine of the radial inward flow or centripetal type, adapted to assist in the work of the main turbine 201 and thus to enhance the efficiency of the device. The hydraulic transmission acts as torque transformer when the difference between the speed of pump 200 and shaft 87 is such and when the torque demanded from the turbine exceeds the torque of the motor so much that the liquid circulating through wheels 200, 201 and 202 tends to operate wheel 202 in a direction which is opposite to that of the rotation of the pump. It acts as hydraulic pump-turbine coupling, when the circulation of the liquid is such as to rotate wheel 202 in the same direction as wheel 201 which is the case when the torque demanded from the turbine end is smaller than the torque supplied by the motor.

New over said Patent No. 1,970,236 is the arrangement of the oil flow through transmission 12. An oil pump 74 is driven by means of an endless chain 75 which is also arranged as chain wheel connected to the hollow shaft 76 which is connected to the pump part 77 of transmission 12 and driven thereby. Pump 74 is arranged at the lowest point of the casing 78 of the hydraulic transmission. The pump draws oil through the suction opening 79 from oil compartment 80 and presses the oil through conduit 81 into oil cooler 82. Therefrom the oil flows through conduit 83 into the annular space 84 shown in Fig. 9 and therefrom through the hollow shaft 76 into the hydraulic transmission proper, as is indicated by arrows. From the clearances between the rotors of said transmission, the oil flows through the radial bores 85 into the central bore 86 of shaft 87 which is the driven shaft of the hydraulic transmission. From bore 86, the oil flows through the radial bores 88 into the annular channel 89 and therefrom through channel 90 shown in Fig. 13 into the oil collecting chamber 91. From chamber 91, the oil passes through the labyrinth channel 92 which comprises a plurality of sharp bends into chamber 93. It must be noted that the bottoms of chambers 80, 91, and 93 slope upwards to the right and that the outlet of channel 92 is at a higher elevation than its inlet. The labyrinth channel 92 has a throttling effect on the oil flow, whereby the oil flow from one chamber into the other is retarded which is important when the transmission rocks as is usual when it is mounted on a vehicle. The chamber 80 has a comparatively small extension in axial direction but is rather wide; its upper closure has the shape of a semicircle, whereby the fluid level 100 is made to stay at the same distance 101 over the lowest point of the chamber and over the pump 74. Thereby reliable operation of the pump is assured. In axial direction, the capacity of the chambers 91 and 93 decreases, due to the sloping configuration of their bottoms. Thereby a longitudinal or axial rocking of the transmission has little influence on the fluid level 100 and its elevation over pump 74. From chamber 93, the oil flows to another labyrinth channel 94 into chamber 80, wherefrom it again enters pump 74. On the path of the oil through the several chambers and labyrinth channels, air and foam are separated from the oil. The upper parts of chambers 80, 91, and 93 are interconnected by means of bores. From chamber 80, the air enters through passages 95 and 96 into the upper part of the casing which contains the speed changing gear which is arranged between hydraulic transmission 12 and shaft 28. Therefrom the air escapes into the atmosphere. The same oil is used for the hydraulic transmission and for lubricating the speed changing gears; opening 97 takes care of this. At the lowest point of the casing, an oil discharge opening 98 for draining the casing is provided. The casing can be filled with oil by using opening 99.

It should be noted that with the oil flow arrangement as described no tubing, joints, etc., are required, except the connections between the casing and the oil cooler. The whole casing is of compact design and has an outside configuration which well lends itself to use on motor cars, etc., where the space is limited. In case no speed changing mechanism is used in between motor and hydraulic transmission, the casing of the latter may be directly flanged to that of the motor.

Immediately adjacent to hydraulic transmission 12, a mechanical speed changing mechanism is provided which permits three different speed reductions and also reversing of the direction of drive shaft 87 of the speed changer which is the driven shaft of hydraulic transmission 12:

When it is desired to operate shaft 28 at high speed, i. e., the same speed as is shaft 87, the operating disc 102, which is axially but not rotatably movable on shaft 87 and which is common to the two friction clutches 103 and 104, is moved to the right, whereby clutch 104 is engaged and shaft 87 is directly connected with shaft 28.

When it is desired to operate shaft 87 at higher speed than is shaft 28, disc member 102 is pushed to the left, whereby clutch 103 is engaged and shaft 87 is coupled with gear wheel 105 which is in mesh with gear wheel 106 which is rigidly connected with auxiliary shaft 107. To shaft 107, also gear wheel 108 is connected which is in mesh with gear wheel 109 which latter wheel is rigidly connected with shaft 28. Power is then transmitted from shaft 87 to shaft 28 by means of clutch 102, 103, gears 105, 106, auxiliary shaft 107, and speed reducing gears 108, 109.

If it is desired to operate shaft 28 at still lower speed as compared with shaft 87, gear wheel 110 which is axially slidable but not rotatably movable with respect to extension 111 of auxiliary shaft 107 is moved to the left until it meshes with gear wheel 112 which is keyed to shaft 87. Disc 102 is held in neutral position and neither clutch 103 nor 104 is engaged.

Figure 13:
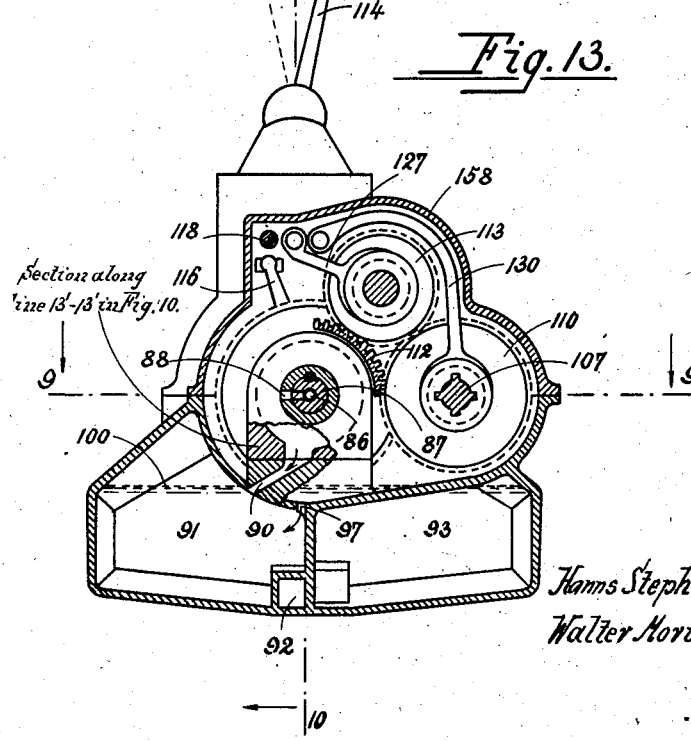
Fig. 13 is a transverse sectional view of a transmission according to the present invention taken along lines 13—13 and 13'—13' of Fig. 10.

The gear also has a provision for reversing the direction of rotation of shaft 87. If gear wheel 113 which is shown in Figs. 13 and 14 is brought into a position to mesh with gear wheels 112 and 110 which are in the position shown in Fig. 14 and the clutch operating disc 102 is in neutral position, then power is transmitted from shaft 87 to shaft 28 by means of gear wheels 112, 113, 110 and 108 and 109, and shaft 28 is rotated in the direction opposite to shaft 87.

We shall now proceed to describe the mechanism for operating the clutch operating disc 102 and for shifting gear wheel 110 and the reverse wheel 113.

All the operations mentioned in the following paragraph are carried out by manipulating lever 114.

For operating clutch operating disc 102, this is provided with a fork 115 having a stem 116, the ball-shaped end of which movably fits into the reset of block 117 which is mounted to the laterally movable rod 118. Rod 118 carries another block 119 also provided with a reset into which fits the ball-shaped end 120 of lever 114. By clockwise movement of lever 114, rod 118 is pushed to the left and clutch 103 is engaged; by counterclockwise movement of lever 114, clutch 104 is engaged. Rod 118 is held in left, neutral or right position, respectively, by the provision of notches 121 which are individually engaged by ball 122 which is pressed into the individual notches by means of spring 123. For carrying out the just described operations, lever 114 is in the position shown in Fig. 13.

By moving lever 114 to the left as seen in Fig. 13 into the position indicated by dash and dotted line 124, block 125 of rod 126 is engaged, to which rod the fork 127 for moving the reverse wheel 113 is connected. The latter is brought in mesh with wheels 110 and 112 by moving lever 114 counter-clockwise as seen in Fig. 10 and into the position marked R.

By moving lever 114 still further to the left as seen in Fig. 13 its end 120 is brought in mesh with block 128 of rod 129 which carries fork 130 for shifting gear wheel 110. Wheel 110 is brought into mesh with wheel 112 by moving lever 114 clockwise as seen in Fig. 10 into the position marked I. This first speed is used very seldom when greatest draw bar pull is required. Generally second and third speed will be used and these can easily be obtained by using the clutches 103 and 104.

Fig. 16 shows plate 131 for assuring the correct positions of lever 114 for the various gear shifting operations. The various portions of the lever end 120 are marked on the drawings: I indicates the position for first speed, II indicates the position for second speed, III indicates the position for third speed, R indicates the position for reverse operation.

For setting the gear for reverse operation or for first speed, it is desirable to first somewhat brake the action of shaft 87. The braking effect is strongest by engaging that clutch between the parts of which the difference of speed is greatest; this is clutch 104 which is slightly engaged when moving lever 114 sideways as seen in Fig. 13, because the cross slot 132 in plate 131 is somewhat out of the position which assures movement of lever 114 in neutral position. Lever 114 would be in neutral position if its end 120 would move in a slot as indicated by dotted lines in Fig. 16.

Now follows a description of the operation of rod 118 and setting the gears or rather clutches 103 and 104 for second and third speed by means of the gas pedal 133 in case the motor for driving the transmission according to the present invention is an internal combustion motor. Pedal 133 is connected to a lever 134 swingable about fulcrum 135. When lever 134 is pressed down, this is done against the tension of spring 136. Lever 134 is resiliently coupled to the gas throttle lever 137. The position of lever 134 marked A in Fig. 10 corresponds to the right running condition of the motor with much throttled fuel admission; the position of lever 134 marked B corresponds to the full gas operation. The movement of the gas throttle is limited by means of the abutments 138. If lever 134 is pressed further down, for example, until the position marked C is reached, then the movement of lever 134 takes place against the tension of spring 139 because lever 137 had reached its outermost position already when lever 134 was in position B. Connected with lever 134 is a toothed segment 140 which cooperates with and drives toothed segment 141 which latter revolves about pin 142 and carries a pin 143 which latter pin movably carries pawl 144. Pawl 144 cooperates with ratchet wheel 145 which is coaxial with segment 141. Pawl 144 has an extension 146 which is in abutting engagement with spring 147 which presses the pawl onto wheel 145. Ratchet wheel 145 has an internal spur gear 148 which cooperates with and revolves shaft 149 which is provided for this purpose with an external gear. Shaft 149 carries a crank 150 the pin 151 of which is adapted to move in slot 180 of the previously described rod 118 and which slot is perpendicular to the axis of said rod. When moving pedal 133 from position B into position C, crank 150 is turned by 180°. In Figs. 12 and 15, the medium or neutral position of crank 150 is shown. The shifting of rod 118 is thus accomplished by the gas pedal in the same manner as can be done by manipulating lever 114. When pedal 133 moves from position A to B, rod 118 is not moved because ratchet wheel 145 and pawl 144 are so set with respect to one another that during this movement the pawl just slides along a tooth of the ratchet wheel.

Fig. 18 is a diagrammatic layout of a transmission in which the reversing mechanism is built integral with the differential, for example, of a motor car. In this arrangement shaft 87' corresponds to shaft 87 of the transmission shown in Fig. 9, shaft 28' to shaft 28 of said transmission, and auxiliary shaft 107' of said transmission to shaft 107. The driving part of clutch 103' is rigidly connected with shaft 87' and tooth wheel 105'. First speed is obtained by not engaging clutch 103', i. e., by leaving the clutch operating disc 102' which is axially but not rotatably movable on shaft 28' in the position shown in Fig. 18 and pushing clutch operating disc 160 of clutch 161 to the left to engage clutch 161. Member 160 is axially but not rotatably movable on shaft 107'. The driving part 162 of clutch 161 is rigidly connected with tooth wheel 106' and rotatable on shaft 107'. The power is then further transmitted by gear wheels 108' and 109' to shaft 28'. Second speed is obtained by engaging clutch 103' and disengaging clutch 161, whereby shaft 87' is directly connected with shaft 28'.

Shaft 28' is coupled up with bevel gear wheel 163 which is in mesh with two other bevel gear wheels 164 and 165. Concentric with wheels 164 and 165 is the differential gear system 166, 167, 168, 169, the wheels 166 and 168 of which can be coupled either to wheel 164 or to wheel 165 by means of the coupling member 170. Member 170 is provided with teeth 171 and 172 which are in mesh with teeth 173 or 174, respectively, according to the position of member 170. Member 170 is laterally moved by finger 176' upon rotation of rod 176. Axially movable connection of member 170 with bevel gear wheels 166 and 169 is effected by cooperation of internal projections and resets provided on member 170 and external projections and resets provided on member 175 which holds wheels 166 and 169.

While we believe the above described embodiments of our invention to be preferred embodiments, we wish it to be understood that we do not desire to be limited to the exact details of design and construction shown and described, for obvious modifications will occur to a person skilled in the art.

What is claimed is:

1. A power transmission comprising a hydraulic transmission having a drive shaft and a driven shaft, a mechanical variable speed transmission connected with said drive shaft and comprising parts adapted to be connected with said driven shaft, another variable speed transmission connected with said driven shaft and having parts in common with said first mentioned transmission, said parts being adapted to be connected with said drive shaft, whereby the speed at which said hydraulic transmission operates can be changed, and a mechanical connection between said two mechanical transmissions, said parts common to both transmissions increasing the number of variable speeds available from said transmissions.

2. A power transmission comprising a hydraulic transmission having a drive shaft and a driven shaft, a mechanical variable speed transmission connected with said drive shaft, a variable speed transmission connected with said driven shaft, whereby the speed at which said hydraulic transmission operates can be changed, and a mechanical connection by-passing said hydraulic transmission and interconnecting said two mechanical transmissions, whereby power is transmitted directly from said first mentioned mechanical transmission to said other mechanical transmission purely mechanically and said hydraulic transmission can be entirely left out of power transmission.

3. A power transmission comprising a hydraulic transmission having a drive shaft and a driven shaft, a mechanical variable speed transmission connected with said driven shaft and also having a driven shaft, said mechanical transmission comprising a plurality of clutches, each clutch having a driving and a driven part, said driving parts being permanently connected with said driven shaft of said hydraulic transmission, an auxiliary shaft, a set of gear wheels consisting of a gear wheel connected with the driven part of one of said clutches and another gear wheel connected with said auxiliary shaft, another set of gear wheels comprising a gear wheel connected with said auxiliary shaft and another gear wheel connected with the driven part of the other of said clutches and with the driven shaft of said mechanical transmission, a third set of gear wheels comprising a gear wheel connected with said driven shaft of said hydraulic transmission and another gear wheel axially movably connected with said auxiliary shaft, gear shifting means connected with said last mentioned gear wheel for axially moving said gear wheel on said auxiliary shaft and bringing it to mesh with that gear wheel of said third set of gear wheels which is connected with said driven shaft of said hydraulic transmission, clutch engaging means common to all of said clutches, operating means adapted to operate said gear shifting means as well as said clutch engaging means, adjusting means connected with said operating means and adapted to cause temporary engagement of one of said clutches by said clutch engaging means when said operating means are operated for operating said gear shifting means, whereby a braking effect is obtained which facilitates the gear shifting operation.

4. A power transmission comprising a hydraulic transmission having a drive shaft and a driven shaft, a mechanical variable speed transmission connected with said driven shaft and also having a driven shaft, said mechanical transmission comprising a plurality of clutches, each clutch having a driving and a driven part, said driving parts being permanently connected with said driven shaft of said hydraulic transmission, an auxiliary shaft, a set of gear wheels consisting of a gear wheel connected with the driven part of one of said clutches and another gear wheel connected with said auxiliary shaft, another set of gear wheels comprising a gear wheel connected with said auxiliary shaft and another gear wheel connected with the driven part of another of said clutches and with the driven shaft of said mechanical transmission, a third set of gear wheels comprising a gear wheel connected with said driven shaft of said hydraulic transmission and another gear wheel axially movably connected with said auxiliary shaft, gear shifting means connected with said last mentioned gear wheel for axially moving said gear wheel on said auxiliary shaft and bringing it to mesh with that gear wheel of said third set of gear wheels which is connected with said driven shaft of said hydraulic transmission, clutch engaging means common to all of said clutches, operating means adapted to operate said gear shifting means as well as said clutch engaging means, adjusting means connected with said operating means and adapted to cause temporary engagement of that one of said clutches the driven part of which is connected with said driven shaft of said mechanical transmission when said operating means are operated for operating said gear shifting means, whereby a braking effect is obtained which facilitates the gear shifting operation.

5. A power transmission comprising a hydraulic transmission, a mechanical variable speed transmission, an operating fluid for said hydraulic transmission, a fluid inlet and a fluid outlet on said hydraulic transmission, a plurality of chambers situated adjacent to said mechanical transmission, conduits serially connecting said chambers for fluid flow, a conduit connecting said fluid inlet with one of said chambers, and a conduit connecting said fluid outlet and that one of said chambers which is furthest remote with respect to fluid flow from said chamber connected with said fluid inlet.

6. A power transmission comprising a hydraulic transmission, a mechanical variable speed transmission, an operating fluid for said hydraulic transmission, a fluid inlet and a fluid outlet on said hydraulic transmission, a plurality of chambers situated adjacent to said mechanical transmission, conduits serially connecting said chambers for fluid flow, a conduit connecting said fluid inlet with one of said chambers, a conduit connecting said fluid outlet with that one of said chambers which is furthest remote with respect to fluid flow from said chamber connected with said fluid inlet, and a casing common to said hydraulic transmission, said mechanical transmission and said chambers.

7. A power transmission comprising a hydraulic transmission, a mechanical variable speed transmission, an operating fluid for said hydraulic transmission, a fluid inlet and a fluid outlet on said hydraulic transmission, a plurality of chambers situated adjacent to said mechanical transmission, conduits serially connecting said chambers for fluid flow, a conduit connecting said fluid inlet with one of said chambers, a conduit connecting said fluid outlet with that one of said chambers which is furthest remote with respect to fluid flow from said chamber connected to said fluid inlet, and a casing common to said mechanical transmission and to said chambers.

8. A power transmission comprising a hydraulic transmission, a mechanical variable speed transmission, an operating fluid for said hydraulic transmission, a fluid inlet and a fluid outlet on said hydraulic transmission, a plurality of chambers situated adjacent to said mechanical transmission, conduits serially connecting said chambers for fluid flow, a conduit connecting said fluid inlet with one of said chambers, a conduit connecting said fluid outlet with that one of said chambers which is furthest remote with respect to fluid flow from said chamber connected with said fluid inlet, and a conduit connecting one of said chambers with said mechanical transmission, whereby the operating fluid is used for operating said hydraulic transmission as well as for lubricating said mechanical transmission.

9. A power transmission comprising, in combination with a hydrodynamic power transmission consisting of a hydraulic coupling and hydraulic torque transformer integral therewith and having a unified operating fluid circuit, a mechanical variable speed transmission having a speed increasing stage and being disposed ahead of said hydrodynamic power transmission with respect to the flow of power.

10. A power transmission comprising a hydraulic coupling and torque transformer forming a single hydraulic transmission unit, a drive shaft and a driven shaft operatively connected with said hydraulic transmission unit, and a mechanical, speed increasing variable speed transmission connected with said drive shaft for changing the speed of said drive shaft.

11. A power transmission comprising a hydraulic coupling and torque transformer forming a single hydraulic transmission unit, a drive shaft and a driven shaft operatively connected with said hydraulic transmission unit, a mechanical, speed increasing variable speed transmission connected with said drive shaft, and another variable speed transmission connected with said driven shaft for changing the operating speed of said hydraulic transmission unit.

HANNS STEPHAN WILHELM BÖLLINGER.
WALTER MORITZ ALWIN GOTTSCHALCK.